US011909671B1

(12) United States Patent
Barrantes Chaves et al.

(10) Patent No.: US 11,909,671 B1
(45) Date of Patent: Feb. 20, 2024

(54) EFFICIENT PORT RECONFIGURATION

(71) Applicant: Hewlett Packard Enterprise Development LP, Houston, TX (US)

(72) Inventors: Pablo Cesar Barrantes Chaves, Heredia (CR); Francisco José Rojas Fonseca, Alajuela (CR); Jorge Arturo Sauma Vargas, San Jose (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/890,770

(22) Filed: Aug. 18, 2022

(51) Int. Cl.
*H04L 49/65* (2022.01)
*H04L 45/60* (2022.01)
*H04L 49/111* (2022.01)

(52) U.S. Cl.
CPC .............. *H04L 49/65* (2013.01); *H04L 45/60* (2013.01); *H04L 49/111* (2022.05)

(58) Field of Classification Search
CPC ......... H04L 49/65; H04L 45/60; H04L 49/111
See application file for complete search history.

(56) References Cited

U.S. PATENT DOCUMENTS

| 10,999,127 | B1* | 5/2021 | Zuber | H04L 41/065 |
| 2015/0023368 | A1* | 1/2015 | Connolly | H04L 12/6402 370/420 |
| 2015/0381428 | A1* | 12/2015 | Ong | H04L 45/42 709/223 |
| 2017/0300229 | A1* | 10/2017 | Jakkula | G06F 3/0652 |

\* cited by examiner

*Primary Examiner* — Luat Phung
(74) *Attorney, Agent, or Firm* — Yao Legal Services, Inc.

(57) ABSTRACT

A system for facilitating efficient port reconfiguration at a switch is provided. During operation, the system can identify a target port of the switch for reconfiguration based on one or more reconfiguration parameters indicating how a set of logical ports are generated from the target port. The system can disable the target port at the control plane of the switch, which disables features provided to the target port from the control plane. The control plane can provide a set of features supported by the switch at a port-level granularity for facilitating operations of the switch. The system can then configure the forwarding hardware based on the reconfiguration parameters to accommodate the set of logical ports. When the reconfiguration of the target port is complete, the system can enable a respective logical port at the control plane, which enables one or more features for the logical port from the control plane.

20 Claims, 9 Drawing Sheets

EFFICIENT PORT RECONFIGURATION

BACKGROUND

Field

The present disclosure relates to communication networks. More specifically, the present disclosure relates to a method and system for reconfiguring a port of a switch based on independent data and control planes.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

The Internet is the delivery medium for a variety of applications running on physical and virtual devices. Such applications have brought a progressively increasing amount of network traffic. As a result, equipment vendors race to build switches with versatile capabilities, such as network cards equipped with high-capacity (high bandwidth) ports. Furthermore, the switch can participate in different types of networks while operating in different roles. For example, the switch can operate as an edge switch that can couple end devices (e.g., hosts, customer switches, etc.).

Typically, such an end device may not send or receive a high volume of traffic, causing under-utilization of the capacity of the port. The capacity of the port can be distributed among multiple end devices to utilize the capacity of the port. The switch can then support "port splitting" that can represent the port as a plurality of logical ports. The capacity or bandwidth of the port can be divided among the logical ports. As a result, the port can couple a plurality of end devices, each corresponding to a logical port. These end devices can be coupled to the port using a split cable, such as a hydra cable.

The single end of the cable can be coupled to the port, and each of these end devices can be coupled to one of the split ends of the cable. From the end device's perspective, the end device can be coupled to an individual port of the switch (i.e., the corresponding logical port). The data rate between the physical port and the end device can be based on the portion of the capacity of the port allocated to the logical port. Even though port splitting can be helpful for the utilization of the capacity of the port, splitting the port of an operational switch can cause traffic disruption.

The aspects described herein solve the problem of reducing the impact of reconfiguration of a port of an operational switch by (i) disabling the features at a port-level granularity at the control plane, which can operate independently of the data plane; (ii) disabling and reconfiguring the port at the switch hardware; and (iii) enabling a respective reconfigured port at the control plane, thereby associating the features with the reconfigured port. Here, the reconfiguration of the port can include splitting the port into a set of logical ports or replacing the port with a set of new ports by replacing the line card.

Since the operational switch can actively receive and forward traffic, if the port reconfiguration requires rebooting of the line card hosting the port, traffic through other ports of the line card is interrupted. By operating the control and data planes independently, the switch can reconfigure a port of the line card while continuing to provide the features to the other ports. The continuous presence of the features can allow these ports to remain operational during the reconfiguration process and reduce the impact on traffic.

With existing technologies, the control plane of the switch can provide a set of features, each of which can correspond to the switch's capability of performing an operation (or service) in a network, to a respective port. For example, respective features can allow a port of the switch to perform layer-2 forwarding, virtual local area network (VLAN) management, and media access control (MAC) address learning. The switch can deploy a corresponding daemon for managing and providing a feature. The data plane of the switch can use these features to forward packets via the port. Hence, the control plane typically facilitates these features to the port while the port is operational at the data plane.

Since the data plane is often managed by individual line cards, disabling the features at the control plane for a port may require disassociation of the features for the line card. In other words, the control plane can facilitate data plane management at a line-card-level granularity. Consequently, reconfiguring a port of a line card in a switch may require rebooting the line card. That is, the control plane of the switch may not support the reconfiguration of an individual port without rebooting the line card hosting the port. As a result, during the reconfiguration process for the port, traffic through the other ports of the line card is also interrupted even though the other ports may not participate in the reconfiguration process. Hence, the port reconfiguration process at a switch can be inefficient and may cause loss of traffic at ports not participating in the process.

To solve this problem, the control plane of the switch can be configured to provide the features supported by the switch (e.g., virtual local area networks (VLANs)) at a port-level granularity. Since the data plane management of the switch is typically performed by the line cards, the switch can operate the control plane independent of the data plane. As a result, the switch can enable and disable features for an individual port of a line card without impacting the other ports of the line card. While the port at the control plane remains disabled, a respective daemon can consider the port to be unavailable and terminate the corresponding feature for the port. This allows the switch to reconfigure the port at the forwarding hardware (i.e., the application-specific integrated circuit (ASIC)) of the line card without interrupting traffic at the other ports of the line card.

During operation, an administrator can issue a command for port reconfiguration for a port using a user interface. Examples of a user interface can include, but are not limited to, a command line interface (CLI), a graphical user interface (GUI), a touch interface, and a gesture-detection interface. The command can specify the port for reconfiguration and provide associated parameters, such as the number of reconfigured ports to be generated from the port and bandwidth allocated to a respective reconfigured port. In some examples, the switch can support a reconfiguration policy that can dictate how the port is reconfigured. The policy can indicate how many reconfigured ports can be generated from an individual port (e.g., two, four, or eight, etc.). Furthermore, the policy may indicate that the bandwidth of the port should be divided equally among the reconfigured ports.

Upon receiving the command, a management system of the switch can initiate the port reconfiguration process. The management system can be deployed in the operating system of the switch or a programmable hardware module. The management system can disable the port at the control plane. Consequently, the features of the port can become disabled and disassociated with the port. The daemons can then terminate the corresponding services for the port. As a result, when the port is disabled at the control plane, the port can stop receiving and forwarding traffic even though the port can remain present in the forwarding hardware of the line card. Since the features are associated with an individual port, the other ports of the line card can continue operations based on the corresponding features during the port reconfiguration process.

Subsequently, the management system can configure the forwarding hardware of the line card to disable the port. Hence, from the line card's perspective, the port becomes unavailable (e.g., the port can become removed from the line card). The management system can then reconfigure the port based on the parameters of the command and the reconfiguration policy. The reconfiguration can include replacing the port with a set of physical ports by replacing the line card with a new line card. The new line card can have more ports than the previous line card. The reconfiguration can also include representing the port as a set of logical ports based on port splitting. The bandwidth of the port can be distributed among the logical ports based on the policy. When the reconfiguration is complete, these logical ports are enabled at the forwarding hardware. The line card can then consider them as new ports with corresponding capacity.

The control plane can then discover the new ports in the line card. Accordingly, the control plane can allocate a set of features to each of these new ports. The respective daemons facilitating the corresponding features can apply a default configuration to a respective new port and start providing the features to the new ports. An administrator may need to configure the features for a respective new port. For example, a new port can become operational with a set of default VLANs. An administrator may need to configure which VLANs should be configured for that port. Nonetheless, since the reconfiguration process is handled by the switch internally, the administrator does not need to issue individual commands to perform the operations or steps of the reconfiguration process.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

Figure 1A:
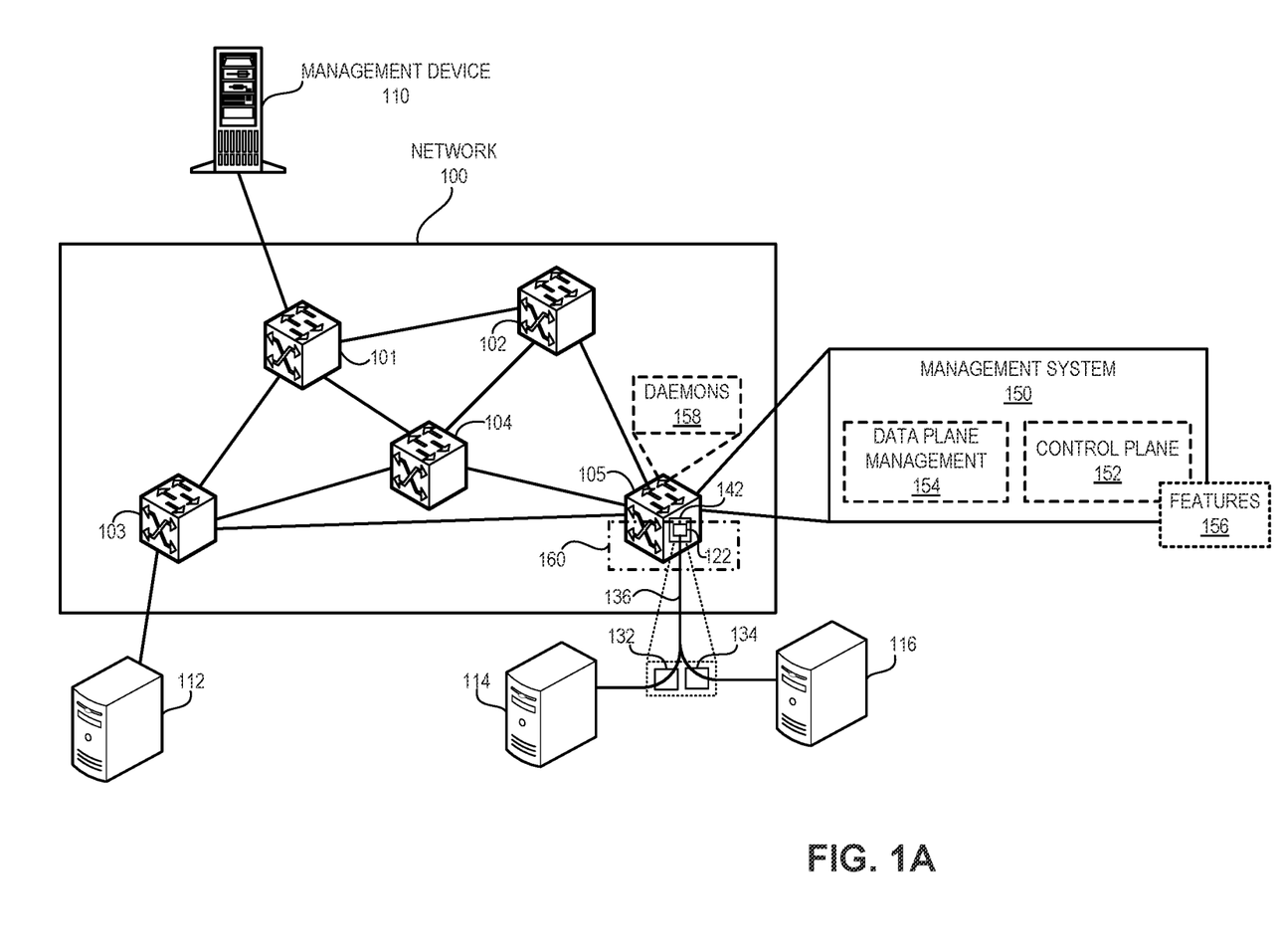
FIG. 1A illustrates an example of efficient port reconfiguration at a switch in a network, in accordance with an aspect of the present application.

FIG. 1A illustrates an example of efficient port reconfiguration at a switch in a network, in accordance with an aspect of the present application. A network 100 can include a number of switches and devices, and may include heterogeneous network components, such as layer-2 and layer-3 hops, and tunnels. In some examples, network 100 can be an Ethernet, InfiniBand, or other networks, and may use a corresponding communication protocol, such as Internet Protocol (IP), FibreChannel over Ethernet (FCoE), or other protocol. Network 100 can include switches 101, 102, 103, 104, and 105, each of which can be associated with a MAC address and an IP address. End device 112 can be coupled to switch 103, and end devices 114 and 116 can be coupled to switch 105.

A respective link in network 100 can be a physical link or a tunnel spanning one or more physical links. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). A respective switch pair in network 100 can be a BGP peer. Network 100 can be coupled to a management device 110, which can manage network 100 and provision switches 101, 102, 103, 104, and 105. Furthermore, management device 110 can allow a user (or administrator) to issue instructions to any of these switches to configure the switch.

With existing technologies, control plane 152 of switch 105 can provide a set of features 156, each of which can correspond to switch 105's capability of performing an operation (or service) in network 100, to a respective port of switch 105. For example, features 156 can allow a port 122 of switch 105 to perform layer-2 forwarding, VLAN management, and MAC address learning. Switch 105 can deploy daemons 158 for managing and providing features 156. Data plane 160 of switch 105 can use features 156 to forward packets via port 122. Hence, control plane 152 typically facilitates features 156 to port 122 while port 122 is operational at data plane 160. Since data plane 160 is often managed by individual line cards, such as line card 142 that hosts port 122, disabling features 156 at control plane 160 for port 122 may require disassociation of features 156 for line card 142. In other words, control plane 152 can facilitate data plane management 154 at a line-card-level granularity.

Line card 142 can include a logic block (e.g., programmable circuitry) that can facilitate data plane management 154 for line card 142. Data plane management 154 can include a group of processes (e.g., corresponding to daemons 158) determining how packets are forwarded at line card 142. Since data plane management 154 is provided at the line-card level, reconfiguring port 122 of line card 142 may require rebooting line card 142. That is, control plane 152 may not support the reconfiguration of port 122 without rebooting line card 142 because data plane management 154 is deployed at line card 142. As a result, during the reconfiguration process for port 122, traffic through the other ports of line card 142 is also interrupted even though the other ports may not participate in the reconfiguration process. Hence, the port reconfiguration process at switch 105 can be inefficient and may cause traffic loss at ports not participating in the process.

To solve this problem, control plane 152 can be configured to provide features 156 (e.g., VLANs) at a port-level granularity. Since data plane management 154 is typically performed by line card 142, a management system 150 of switch 105 can operate control plane 152 and data plane management 154 independently of each other, thereby managing control plane 152 independent of data plane 160. As a result, system 150 can enable and disable a respective feature of features 156 for port 122 of line card 142 without impacting the other ports of line card 142. While port 122 at control plane 152 remains disabled, a respective daemon of daemons 158 can consider port 122 to be unavailable and terminate the corresponding feature for port 122. This allows switch 105 to reconfigure port 122 at the forwarding hardware (i.e., the ASIC) of line card 142 without interrupting traffic at the other ports of line card 142.

The reconfiguration of port 122 can include configuring the hardware of line card 142 to represent port 122 as a set of logical ports based on port splitting or replacing port 122 with a set of physical ports. For example, line card 142 can be replaced with a new line card with more ports (e.g., ports 121, 132, and 134), which can correspond to the replacement ports. In this example, port 122 can be reconfigured as ports 132 and 134, which can be logical ports generated by splitting port 122 or physical ports replacing port 122 in switch 105. If ports 132 and 134 are logical ports generated by splitting port 122, the capacity of port 122 can be divided among logical ports 132 and 134. As a result, port 122 can couple a plurality of end devices 114 and 116 corresponding to ports 132 and 134, respectively. End devices 114 and 116 can be considered individually coupled to ports 132 and 134, respectively.

Physically, end devices 132 and 134 can be coupled to port 122 using a split cable 136, such as a hydra cable. The split cable typically includes a single end on one side and a plurality of split ends on the other side. The single end of cable 136 can be coupled to port 122. On the other hand, each of end devices 114 and 116 can be coupled to one of the split ends of cable 136. The data rate between port 122 and end devices 114 and 114 can be based on the portion of the capacity of port 122 allocated to ports 132 and 134, respectively. When the reconfiguration of port 122 is complete, ports 132 and 134 can become available to the forwarding hardware of line card 142. Ports 132 and 134 can appear as new ports available in line card 142 while the other ports of line card 142 can continue to send and receive traffic.

Control plane 152 can then discover ports 132 and 134 as new ports available at switch 105. Accordingly, system 150 can enable ports 132 and 134 in control plane 152. Once ports 132 and 134 are enabled, system 150 can allocate a set of features from features 156 to each of these new ports. The corresponding set of daemons from daemons 158 can then initiate the features for ports 132 and 134. In this way, system 150 can support port reconfiguration in an operational line card without rebooting the line card. By decoupling control plane 152 from data plane management 154, system 150 can allow data plane management 154 to forward traffic via the other ports of line card 142 when port 122 is reconfigured (e.g., split into logical ports).

Figure 1B:
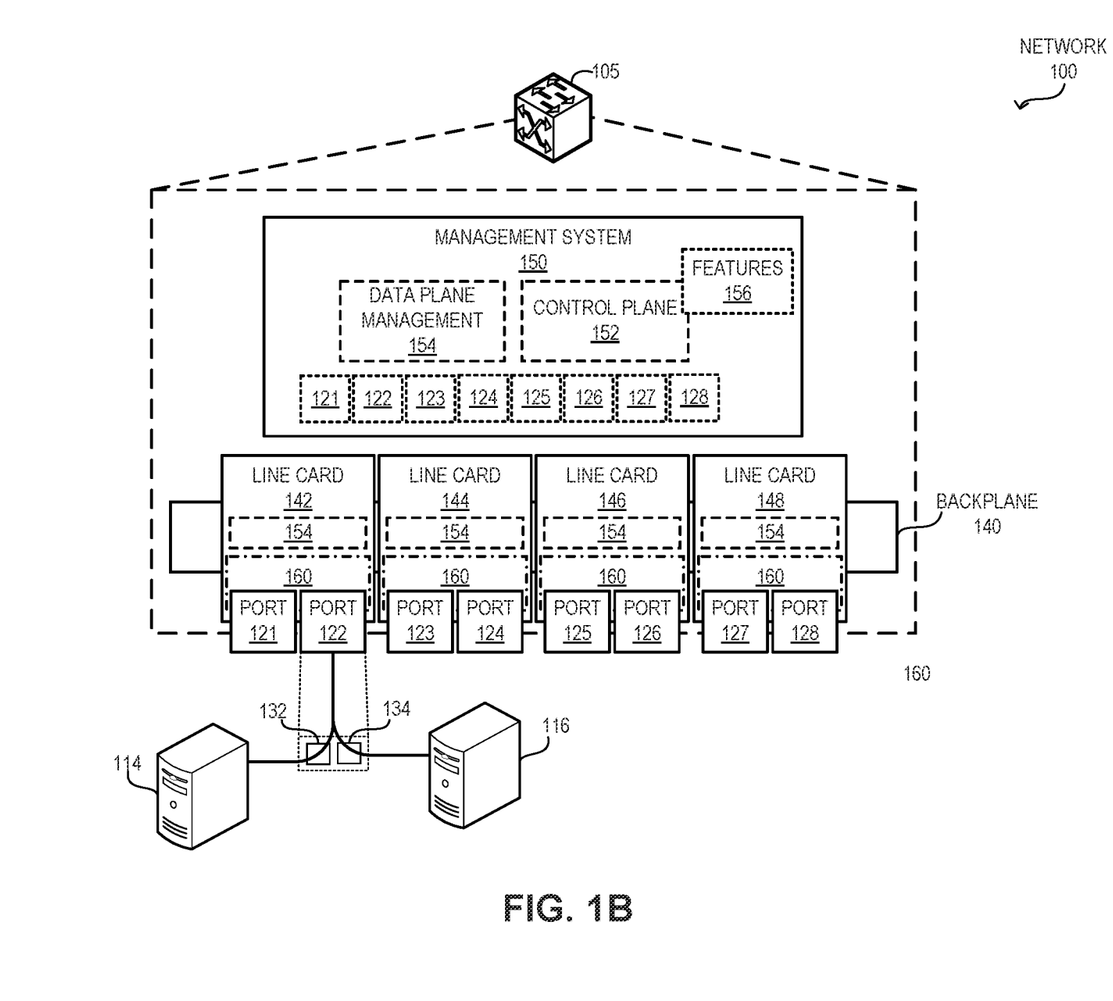
FIG. 1B illustrates an example of efficient port reconfiguration at a switch based on independent data and control planes, in accordance with an aspect of the present application.

FIG. 1B illustrates an example of efficient port reconfiguration at a switch based on independent data and control planes, in accordance with an aspect of the present application. A respective switch in network 100 can include a plurality of line cards. For example, switch 105 can be equipped with line cards 142, 144, 146, and 148. Backplane 140, which can include circuitry for providing connectivity among different modules of switch 105, can couple line cards 142, 144, 146, and 148 to other modules of switch 105. A respective line card can be modular and removable, or attached (e.g., soldered) to backplane 140. Line card 142 can include ports 121 and 122, line card 144 can include ports 123 and 124, line card 146 can include ports 125 and 126, and line card 148 can include ports 127 and 128. Data plane 160 of switch 105 can span these ports.

System 150 can run on the operating system, a management application, or the hardware (e.g., programmable circuitry) of switch 105. System 150 can facilitate control plane 152 and data plane management 154, which manages operations associated with receiving and forwarding a packet. Typically, the information generated by control plane 152 can be used for data plane management 154. For example, routes produced by a routing protocol can be used to determine how a packet should be forwarded in data plane 160. In other words, system 150 can operate data plane management 154 based on control plane 152. An instance of data plane management 154 can be deployed in a respective line card so that the line card can forward packets.

However, if control plane 152 is operated with data plane management 154, an instance of control plane 152 may also run on a line card. Consequently, disabling port 122 for reconfiguration at control plane 152 would involve disabling the instance of control plane 152 of line card 142. As a result, reconfiguring port 122 of line card 142 may require rebooting line card 142 because control plane 152 may not support the reconfiguration of port 122 without rebooting line card 142. As a result, during the reconfiguration process, traffic through port 121 of line card 142 can be interrupted and cause traffic loss.

The decoupling of control plane 152 from data plane 160 by system 150 can allow data plane management 154 to run as a separate instance while receiving control instructions (e.g., for updating routing information) from control plane 152. Since data plane management 154 instances of line cards 142, 144, 146, and 148 can be sufficient for forwarding packets at corresponding line cards, these line cards do not need to deploy an instance of control plane 152. System 150 can then control features 156 at a port-level granularity. Hence, system 150 can disable a port at control plane 152 without impacting data plane management 154.

Accordingly, reconfigure port 122, system 150 can disable port 122 at control plane 152. Disablement of port 122 at control plane 152 stops traffic flow at port 122. Furthermore, because port 122 becomes unavailable at control plane 152, daemons 158 can terminate their corresponding features for port 122. For example, the VLAN daemon may disassociate a respective VLAN from port 122, and the MAC address learning daemon may release a respective MAC address learned at port 122. In this way, a respective feature of features 156 can become disassociated with port 122. System 150 can then reconfigure the forwarding hardware of line card 142 to create ports 132 and 134. When ports 132 and 134 become available at the hardware of line card 142, control plane 152 can discover these ports and associate corresponding features from features 156. This allows port 121 of line card 142 to continue operations based on data plane management 154 during the port reconfiguration process.

Figure 2:
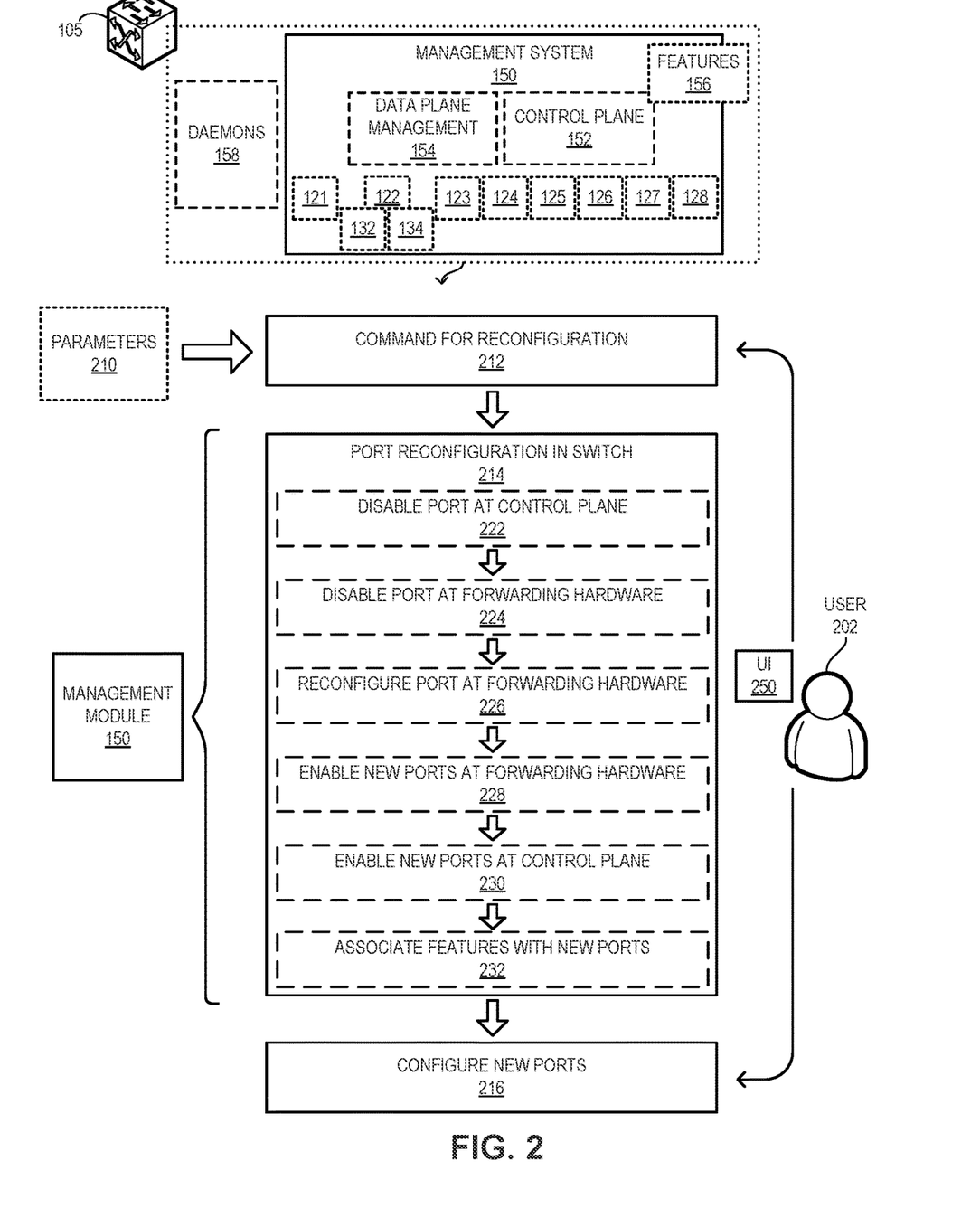
FIG. 2 illustrates an example of an efficient port reconfiguration process in independent data and control planes, in accordance with an aspect of the present application.

FIG. 2 illustrates an example of an efficient port reconfiguration process in independent data and control planes, in accordance with an aspect of the present application. During operation, a user 202 (e.g., an administrator) can issue a command for port reconfiguration for port 202 using a user interface 250 (operation 212). Examples of user interface 250 can include, but are not limited to, a CLI, a GUI, a touch interface, and a gesture-detection interface. The command can be supported by and executable on switch 105. The command can specify an identifier of port 122 and provide associated parameters 210, such as the number of reconfigured ports to be generated from port 122 and bandwidth allocated to a respective reconfigured port. Here, port 122 can be a target port for the command. Switch 105 can support a reconfiguration policy that can dictate how port 122 is reconfigured. In this example, the number of ports to be generated can be two, and the bandwidth of port 122 can be equally distributed among the reconfigured ports.

Upon receiving the command, system 150 can perform the port reconfiguration process in switch 105 (operation 214). The reconfiguration process can be based on the internal operations of switch 105. System 150 can disable port 122 at control plane 152 (operation 222). Consequently, the features of port 122 can become disabled and disassociated with port 122. Daemons 158 can then terminate the corresponding services for port 122. As a result, when port 122 is disabled at control plane 152, port 122 can stop receiving and forwarding traffic even though port 122 can remain present in the forwarding hardware. Subsequently, system 150 can disable port 122 at the forwarding hardware (operation 224).

System 152 can then reconfigure port 122 based on parameters 210 at the forwarding hardware (operation 226). The reconfiguration can include representing port 122 as a set of new ports 132 and 134 based on port splitting or port replacement. When the reconfiguration is complete, system 150 can enable new ports 132 and 134 at the forwarding hardware (operation 228). Control plane 152 can then discover new ports 132 and 134 in the line card. Accordingly, system 150 can enable new ports 132 and 134 at the control plane (operation 230). Control plane 152 can receive a notification from the forwarding hardware (e.g., via a hardware interrupt) indicating the change in hardware, which can correspond to the enablement of new ports 132 and 134 at the forwarding hardware.

Control plane 152 can associate a set of features from features 156 to each of new ports 132 and 134 (operation 232). Daemons 158 can apply a default configuration to a respective new port and start providing the features to new ports 132 and 134. User 202 may need to configure the features for a respective new port using user interface 250. For example, new port 132 can become operational with a set of default VLANs. User 202 may need to configure which VLANs should be configured for port 132. Nonetheless, since the reconfiguration process is handled by switch 105 internally, user 202 does not need to issue individual commands to perform the operations or steps of the reconfiguration process.

Figure 3A:
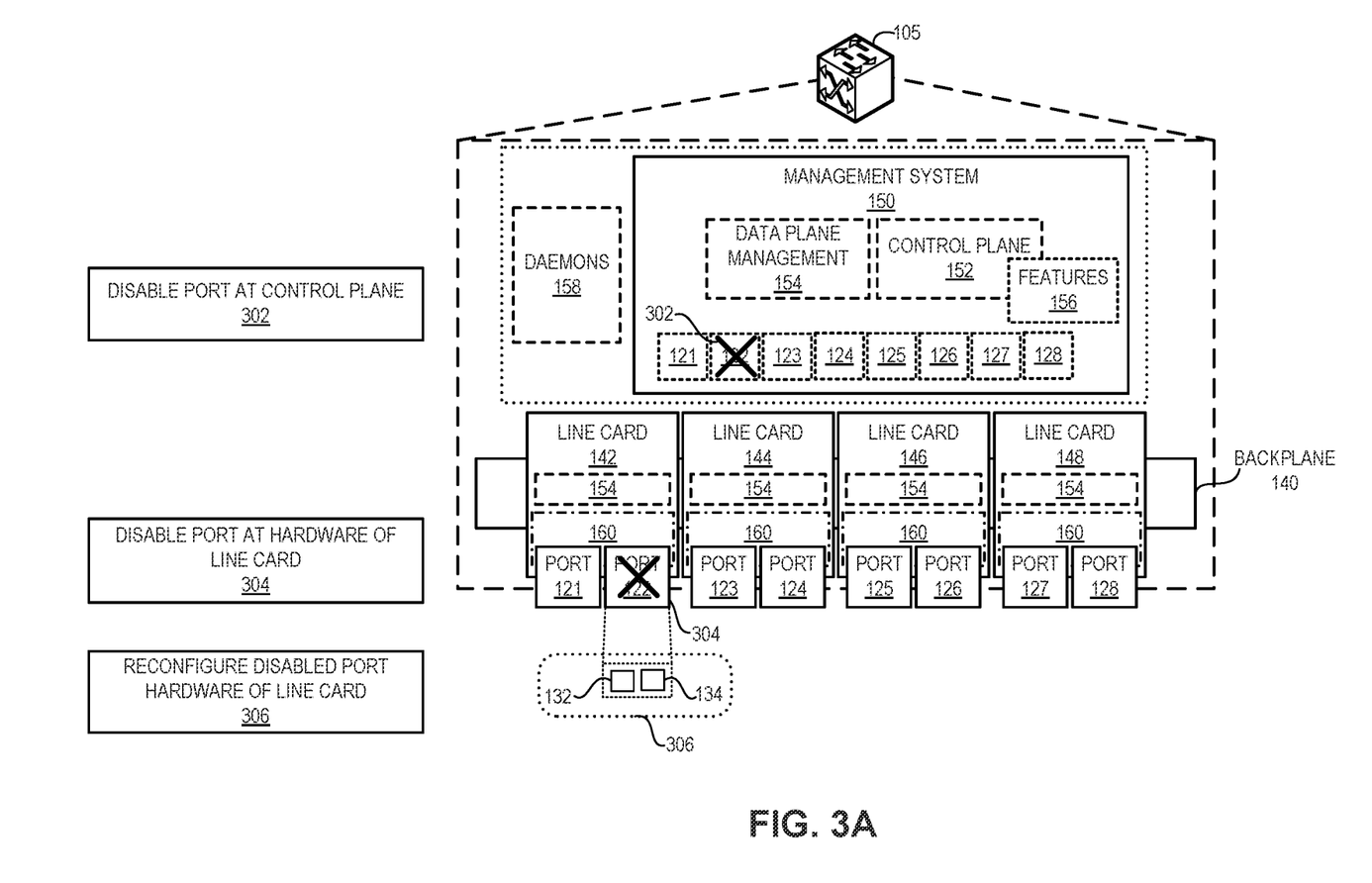
FIG. 3A illustrates an example of port reconfiguration in independent data and control planes, in accordance with an aspect of the present application.

FIG. 3A illustrates an example of port reconfiguration in independent data and control planes, in accordance with an aspect of the present application. Control plane 152 can discover a respective port of switch 105. As a result, control plane 152 can maintain a reference (denoted with dotted lines) to a respective physical port. A feature allocated to the reference can be programmed to the corresponding physical port. For example, a VLAN is configured for the reference to port 121, switch 105 can program the VLAN for port 121 in line card 142. This allows control plane 152 to provide control information for port 121 while operating separately from data plane management 154. To reconfigure port 122, system 150 can disable the reference to port 122, which in turn, can disable port 122 at control plane 152 (operation 302). Subsequently, system 150 can disable port 122 at the forwarding hardware of line card 142 (operation 304). System 150 can then reconfigure port 122 to generate new ports 132 and 134 (e.g., logical or replacement ports) (operation 306).

Figure 3B:
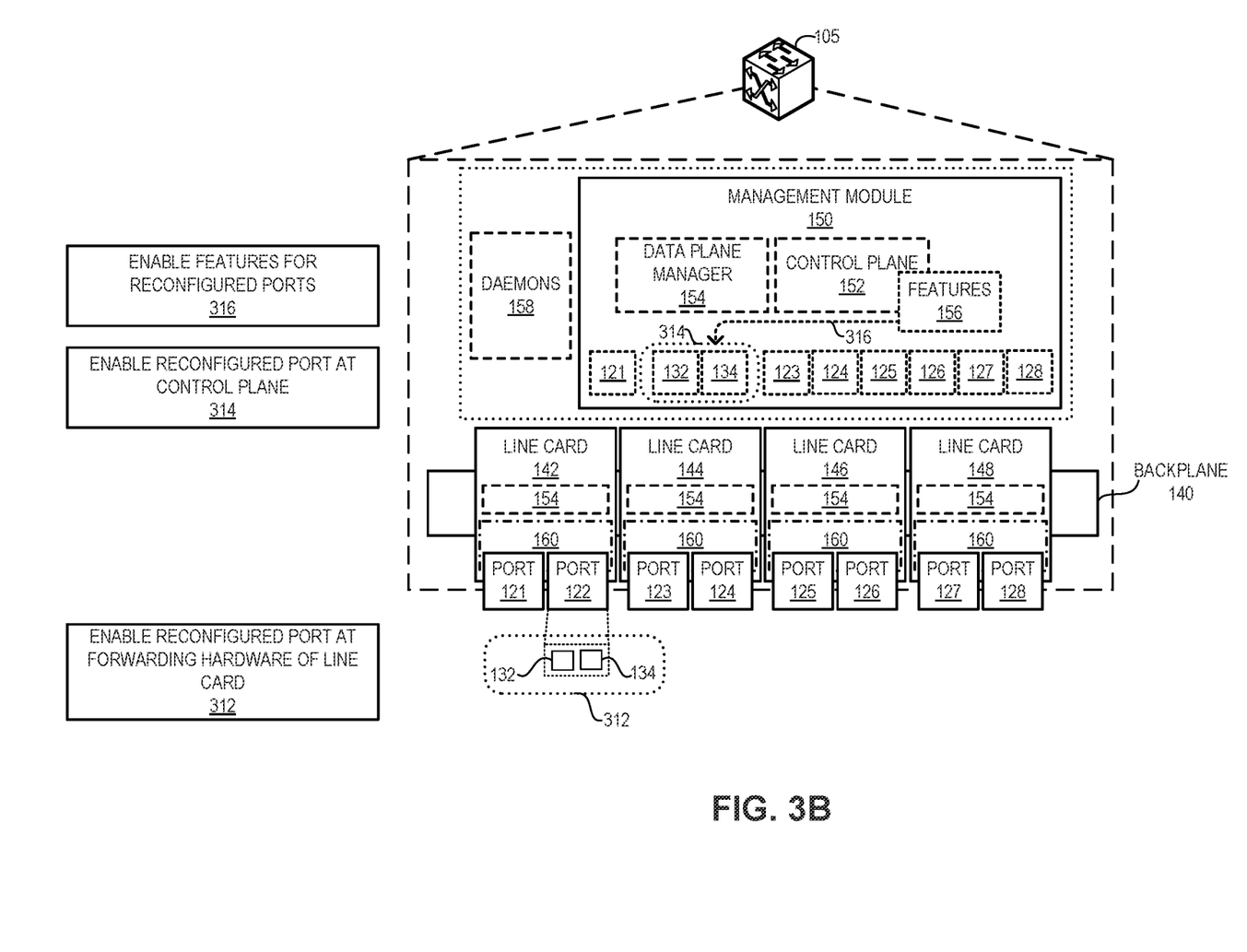
FIG. 3B illustrates an example of the enablement of the reconfigured ports in independent data and control planes, in accordance with an aspect of the present application.

When the reconfiguration of port 122 is complete, and new ports 132 and 134 are generated, ports 132 and 134 need to be operational. FIG. 3B illustrates an example of the enablement of the reconfigured ports in independent data and control planes, in accordance with an aspect of the present application. To make ports 132 and 134 operational, system 150 can enable ports 132 and 134 at the forwarding hardware of line card 142 (operation 312). Since control plane 152 can operate separately from data plane 160, these ports need to be enabled at control plane 152 as well. Control plane 152 can then discover ports 132 and 134 of line card 142. Upon discovery, system 150 can generate respective references for ports 132 and 134, thereby enabling ports 132 and 134 at control plane 152 (operation 314). A set of features from features 156 can then be enabled for each of ports 132 and 134 (operation 316). In this way, port 122 can be reconfigured without disrupting the traffic of port 121.

Figure 4:
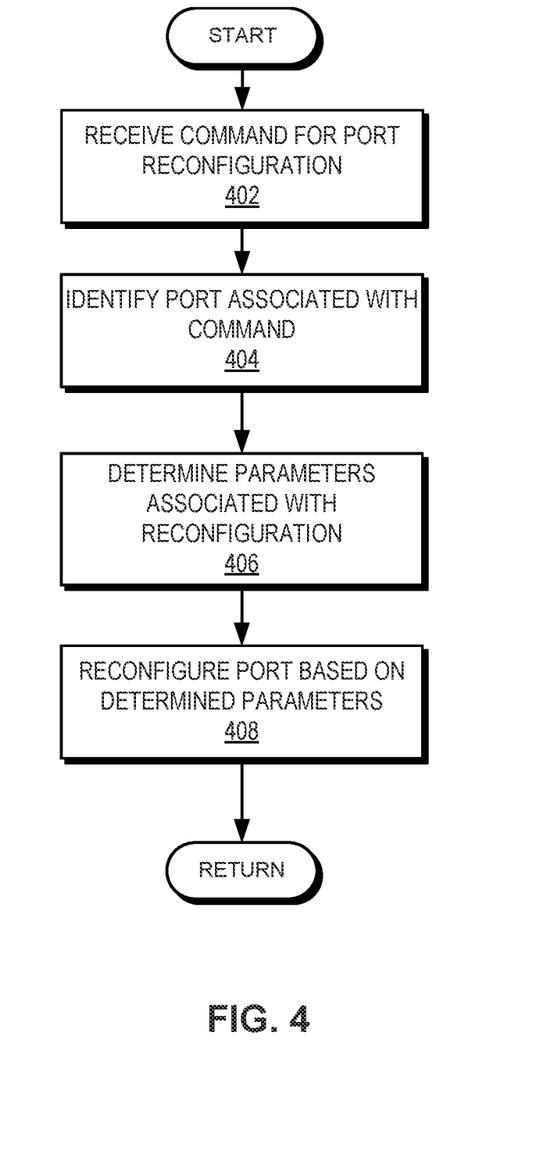
FIG. 4 presents a flowchart illustrating the process of a switch triggering port reconfiguration, in accordance with an aspect of the present application.

FIG. 4 presents a flowchart illustrating the process of a switch triggering port reconfiguration, in accordance with an aspect of the present application. During operation, the switch can receive a command for port reconfiguration (operation 402) and identify the port associated with the command (operation 404). Here, the identified port can be the target port of the command. The command may include an identifier of the target port. The switch can then determine the parameters associated with the reconfiguration (operation 406). Subsequently, the switch can reconfigure the port based on the determined parameters (operation 408).

Figure 5A:
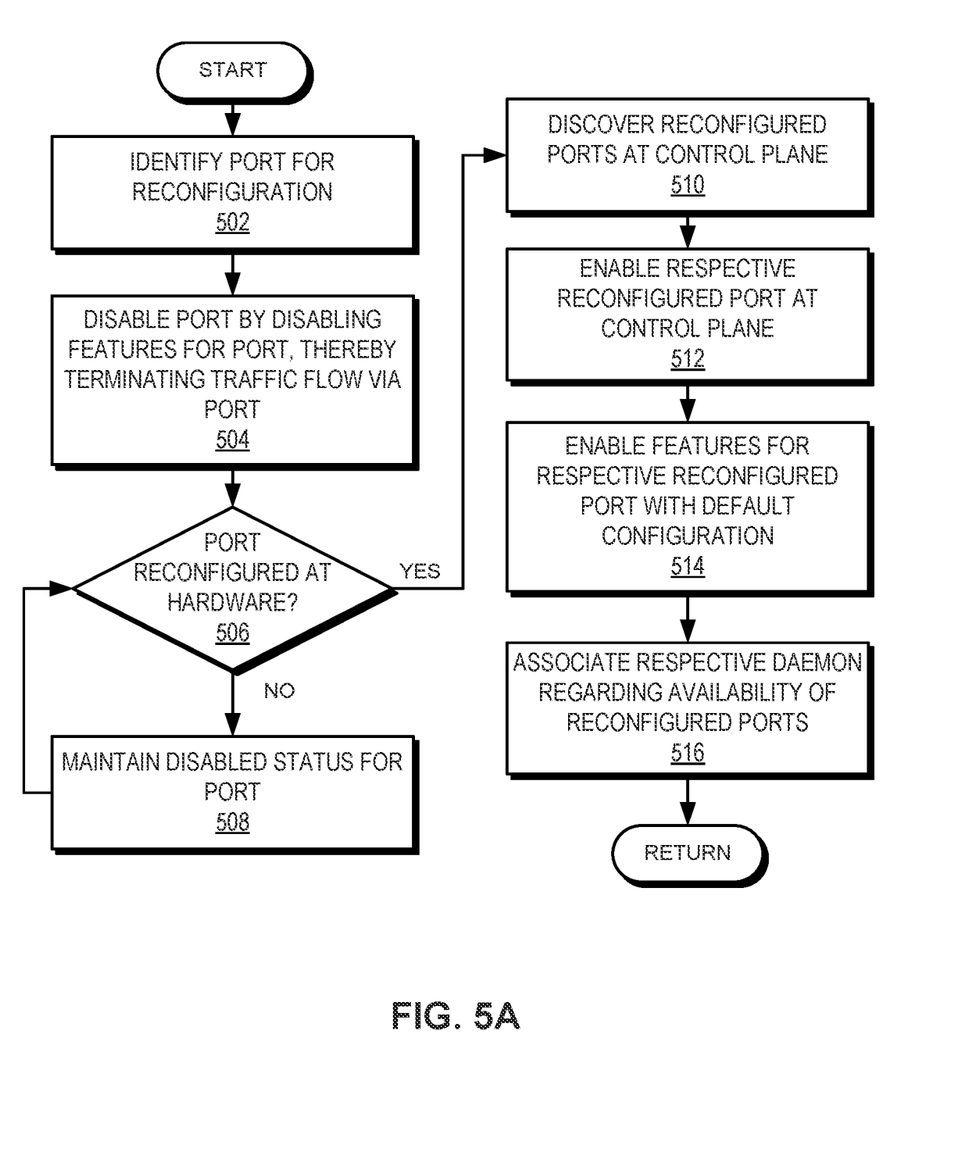
FIG. 5A presents a flowchart illustrating the process of a switch reconfiguring a port in the control plane, in accordance with an aspect of the present application.

FIG. 5A presents a flowchart illustrating the process of a switch reconfiguring a port in the control plane, in accordance with an aspect of the present application. During operation, the switch can identify a port for reconfiguration (operation 502) and disable the port by disabling features of the port, thereby terminating traffic flow via the port (operation 504). The switch can then determine whether the port is reconfigured at the forwarding hardware (operation 506). If the port is not reconfigured yet, the switch can maintain the disabled status for the port (operation 508) and continue to determine whether the port is reconfigured at the forwarding hardware (operation 506).

On the other hand, if the port is reconfigured at the forwarding hardware, the switch can discover the reconfigured ports at the control plane (operation 510). The switch can then enable a respective configured port at the control plane (operation 512). Subsequently, the switch can enable features for a respective reconfigured port with default configuration (operation 514). The switch can also notify a respective daemon regarding the availability of the reconfigured ports (operation 516).

Figure 5B:
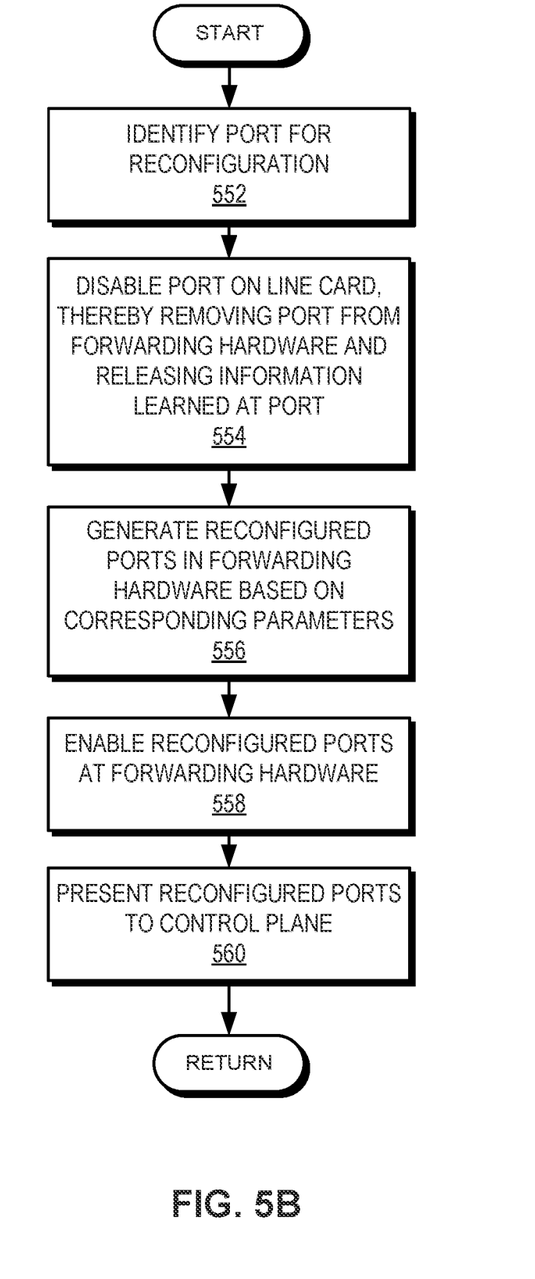
FIG. 5B presents a flowchart illustrating the process of a switch reconfiguring a port in the forwarding hardware, in accordance with an aspect of the present application.

FIG. 5B presents a flowchart illustrating the process of a switch reconfiguring a port in the forwarding hardware, in accordance with an aspect of the present application. During operation, the switch can identify a port for reconfiguration (operation 552) and disable the port on the line card (operation 554). The disablement can remove the port from the hardware and release information learned at the port. The switch can generate configured ports (e.g., by splitting the port) in the hardware based on the corresponding parameters (operation 556) and enable the reconfigured ports at the hardware (operation 558). The switch can then present the reconfigured ports to the control plane (e.g., based on a hardware interrupt) (operation 560).

Figure 6:
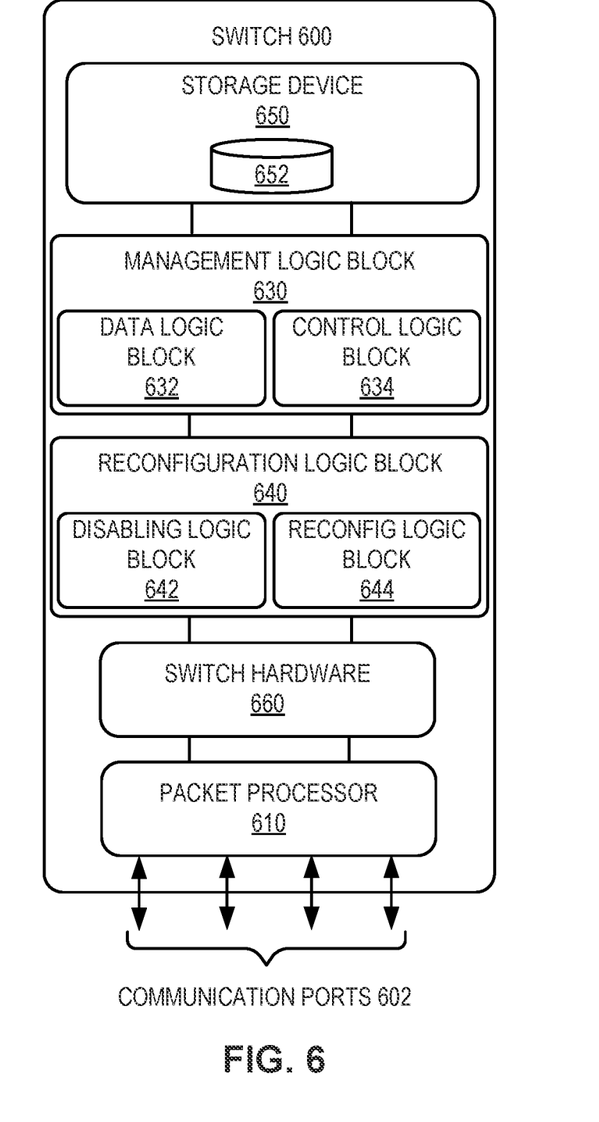
FIG. 6 illustrates an example of a switch supporting efficient port reconfiguration based on independent data and control planes, in accordance with an aspect of the present application.

FIG. 6 illustrates an example of a switch supporting efficient port reconfiguration based on independent data and control planes, in accordance with an aspect of the present application. In this example, a switch 600 can include a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). In other words, switch hardware 660 includes switching circuitry for switch 600. Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with routing, configuration, and interface of switch 600. Switch 600 can include a management logic block 630 that can control and data plane management for switch 600. Management logic block 630 can include a data logic block 632 and a control logic block 634. Data logic block 632 can facilitate data plane management based on control information generated by the control plane of switch 600. Control logic block 634 can operate the control plane for switch 600 separately from the data plane.

Switch 600 can also include a reconfiguration logic block 640 that can support efficient port reconfiguration while switch 600 remains operational. Reconfiguration logic block 640 can allow a user to issue a command for initiating the reconfiguration process for a port. Reconfiguration logic block 640 can include a disabling logic block 642 and a reconfiguration logic block 644. Disabling logic block 642 can disable a port in the control plane and the data plane. Furthermore, reconfiguration logic block 644 can reconfigure a port at the hardware of switch 600 to generate a set of new ports (e.g., split a port into logical ports). Reconfiguration logic block 644 can also discover the new ports in the control plane and associate features to the new ports.

One aspect of the present technology can provide a system for facilitating efficient port reconfiguration at a switch. During operation, the system can identify a target port of the switch for reconfiguration based on one or more reconfiguration parameters indicating how a set of logical ports are generated from the target port. The system can then disable the target port at a control plane of the switch, which can disable a respective feature provided to the target port from the control plane. The control plane can provide a set of features supported by the switch at a port-level granularity for facilitating operations of the switch. Subsequently, the system can configure the forwarding hardware of the switch based on the one or more reconfiguration parameters to accommodate the set of logical ports. When the reconfiguration of the target port is complete at the forwarding hardware, the system can enable a respective logical port at the control plane. The enablement further enables one or more features for the logical port from the control plane.

In a variation on this aspect, the system can receive a command for reconfiguring the target port. The command can include an identifier of the target port and the one or more reconfiguration parameters. The command can be supported by and executable on the switch.

In a variation on this aspect, the target port can be in a line card comprising a plurality of ports including the target port. The control plane can then individually facilitate one or more features to a respective port.

In a further variation, a respective feature of a respective other port of the line card can remain enabled during the reconfiguration. Accordingly, the line card can continue to operate during the reconfiguration of the target port.

In a further variation, the system can determine a replacement of the line card with a second line card comprising a set of ports.

In a variation on this aspect, the system can accommodate the set of logical ports by splitting the target port into the set of logical ports based on the one or more reconfiguration parameters.

In a variation on this aspect, the system can send a packet via a logical port using a split cable. One end of the split cable can be coupled to the target port. Furthermore, a number of splits for the split cable can correspond to a number of logical ports in the set of logical ports.

In a variation on this aspect, the one or more reconfiguration parameters can include one or more of: a number of logical ports to be generated and a bandwidth for allocated for a respective logical port.

In a variation on this aspect, the system can discover the set of logical ports at the control plane as new ports and associate the one or more features with a respective logical port based on a default configuration.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
   identifying a target port of a switch for reconfiguration based on one or more reconfiguration parameters indicating how a set of logical ports are generated from the target port;
   disabling the target port at a control plane of the switch, thereby disabling a respective feature provided to the target port from the control plane, wherein the control plane provides a set of features supported by the switch at a port-level granularity for facilitating operations of the switch;
   configuring forwarding hardware of the switch based on the one or more reconfiguration parameters to accommodate the set of logical ports; and
   in response to the reconfiguration of the target port being complete at the forwarding hardware, enabling a respective logical port at the control plane, thereby enabling one or more features for the logical port from the control plane.

2. The method of claim 1, further comprising receiving a command for reconfiguring the target port, wherein the command comprises an identifier of the target port and the one or more reconfiguration parameters, and wherein the command is supported by and executable on the switch.

3. The method of claim 1, wherein the target port is in a line card comprising a plurality of ports including the target port, wherein the control plane individually facilitates one or more features to a respective port.

4. The method of claim 3, wherein a respective feature of a respective other port of the line card remains enabled during the reconfiguration, thereby allowing the line card to provide continuous operation during the reconfiguration of the target port.

5. The method of claim 3, further comprises determining a replacement of the line card with a second line card comprising a set of ports.

6. The method of claim 1, wherein accommodating the set of logical ports comprises splitting the target port into the set of logical ports based on the one or more reconfiguration parameters.

7. The method of claim 1, further comprising sending a packet via a logical port using a split cable, wherein one end of the split cable is coupled to the target port, and wherein a number of splits for the split cable corresponds to a number of logical ports in the set of logical ports.

8. The method of claim 1, wherein the one or more reconfiguration parameters include one or more of: a number of logical ports to be generated and a bandwidth for allocated for a respective logical port.

9. The method of claim 1, further comprising:
   discovering the set of logical ports at the control plane as new ports; and
   associating the one or more features with a respective logical port based on a default configuration.

10. A non-transitory computer-readable storage medium storing instructions that when executed by a computer cause the computer to perform a method, the method comprising:
    identifying a target port of a switch for reconfiguration based on one or more reconfiguration parameters indicating how a set of logical ports are generated from the target port;
    disabling the target port at a control plane of the switch, thereby disabling a respective feature provided to the target port from the control plane, wherein the control plane provides a set of features supported by the switch at a port-level granularity for facilitating operations of the switch;
    configuring forwarding hardware of the switch based on the one or more reconfiguration parameters to accommodate the set of logical ports; and
    in response to the reconfiguration of the target port being complete at the forwarding hardware, enabling a respective logical port at the control plane, thereby enabling one or more features for the logical port from the control plane.

11. The non-transitory computer-readable storage medium of claim 10, wherein the method further comprises receiving a command for reconfiguring the target port, wherein the command comprises an identifier of the target port and the one or more reconfiguration parameters, and wherein the command is supported by and executable on the switch.

12. The non-transitory computer-readable storage medium of claim 10, wherein the target port is in a line card comprising a plurality of ports including the target port, wherein the control plane individually facilitates one or more features to a respective port.

13. The non-transitory computer-readable storage medium of claim 12, wherein a respective feature of a respective other port of the line card remains enabled during the reconfiguration, thereby allowing the line card to provide continuous operation during the reconfiguration of the target port.

14. The non-transitory computer-readable storage medium of claim 12, wherein the method further comprises determining a replacement of the line card with a second line card comprising a set of ports.

15. The non-transitory computer-readable storage medium of claim 10, wherein accommodating the set of logical ports comprises splitting the target port into the set of logical ports based on the one or more reconfiguration parameters.

16. The non-transitory computer-readable storage medium of claim 10, wherein the method further comprises sending a packet via a logical port using a split cable, wherein one end of the split cable is coupled to the target port, and wherein a number of splits for the split cable corresponds to a number of logical ports in the set of logical ports.

17. The non-transitory computer-readable storage medium of claim 10, wherein the one or more reconfiguration parameters include one or more of: a number of logical ports to be generated and a bandwidth for allocated for a respective logical port.

18. The non-transitory computer-readable storage medium of claim 10, wherein the method further comprises:
discovering the set of logical ports at the control plane as new ports; and
associating the one or more features with a respective logical port based on a default configuration.

19. A computer system, comprising:
a processor;
a memory device;
a hardware module comprising forwarding circuitry;
a reconfiguration logic block to identify a target port of a switch for reconfiguration based on one or more reconfiguration parameters indicating how a set of logical ports are generated from the target port; and
a management logic block to disable the target port at a control plane of the switch, thereby disabling a respective feature provided to the target port from the control plane, wherein the control plane provides a set of features supported by the switch at a port-level granularity for facilitating operations of the switch;
wherein the reconfiguration logic block is further to:
configure the hardware module of the switch based on the one or more reconfiguration parameters to accommodate the set of logical ports; and
in response to the reconfiguration of the target port being complete at the forwarding hardware, enabling a respective logical port at the control plane, thereby enabling one or more features for the logical port from the control plane.

20. The computer system of claim 19, wherein the target port is in a line card comprising a plurality of ports including the target port, wherein the control plane individually facilitates one or more features to a respective port, and wherein a respective feature of a respective other port of the line card remains enabled during the reconfiguration, thereby allowing the line card to provide continuous operation during the reconfiguration of the target port.

* * * * *